United States Patent [19]

Mueller

[11] Patent Number: 4,619,974

[45] Date of Patent: Oct. 28, 1986

[54] PERFLUOROALKYL SUBSTITUTED POLYMERS

[75] Inventor: Karl F. Mueller, New York, N.Y.

[73] Assignee: Ciba-Geigy Corporation, Ardsley, N.Y.

[21] Appl. No.: 682,485

[22] Filed: Dec. 17, 1984

Related U.S. Application Data

[63] Continuation of Ser. No. 455,099, Jan. 3, 1983, abandoned.

[51] Int. Cl.$^4$ .............................................. C08F 8/34
[52] U.S. Cl. .................................. 525/332.4; 525/342; 525/350
[58] Field of Search ...................... 525/332.4, 350, 353

[56] References Cited

U.S. PATENT DOCUMENTS 3,551,394 12/1970 Sakuragi ............................. 525/350

FOREIGN PATENT DOCUMENTS 1006590 10/1965 United Kingdom ................ 525/350

Primary Examiner—Christopher A. Henderson
Attorney, Agent, or Firm—Michael W. Glynn; Irving M. Fishman

[57] ABSTRACT

Perfluoroalkyl alkylene substituted polydienes are described which are obtained by addition of perfluoroalkyl-alkylene thiols to polydienes and which are useful as hard, oil- and water repellent coatings on metal, paper, wood, glass ceramics, textiles or leather.

6 Claims, No Drawings

PERFLUOROALKYL SUBSTITUTED POLYMERS

This application is a continuation of application Ser. No. 455,099, filed Jan. 3, 1983, now abandoned.

BACKGROUND OF THE INVENTION

Polymers containing long perfluoroalkyl groups pendant to the main chain are widely used as oil- and water repellent coatings on textiles and paper. Usually such polymers are prepared by polymerization of a perfluoroalkyl group containing monomers, for instance esters of acrylic, methacrylic- or fumaric acid with $R_f(CH_2)_nOH$ as described in U.S. Pat. Nos. 3,068,187, 3,304,278, 4,150,225 or by polycondensation of perfluoroalkyl-substituted diols with diisocyanates, as described in U.S. Pat. Nos. 3,499,940, 3,720,639, 3,935,277, 4,046,944, and 4,098,742.

In each case fluoroalkyl groups containing macromers are the starting material for swelling the corresponding polymer. Due to the bulkiness of the perfluoroalkyl group and its high molecular weight it is difficult and in most structures impossible to reach the high degrees of polymerization necessary to get coatings or shaped articles of great toughness. In addition, the insolubility of highly fluorinated monomers in common organic solvents complicates the synthesis. For these reasons, the perfluoroalkyl substituted polymers reported in the literature are copolymers with non-fluorinated monomers; in this manner high molecular weight polymers can be prepared, but of a relatively low fluorine content.

It has now been discovered, that when perfluoroalkyl substituted thiols are added to a preformed, unsaturated polymer, highly fluorinated prepolymers are obtained which can be used to make tough, abrasive-resistant and oil/and water repellent coatings or articles.

More specifically, this invention described the synthesis of perfluoroalkyl-substiuted polymers by addition of perfluoroalkylalkylene thiols to polydienes, followed optionally by an oxidation of the resulting thioether product to the corresponding sulfoxide and/or sulfone. These polymers are useful as non-wettable, hard coatings for metal, glass, ceramics, masonary, wood, fibers, textiles plastics or other substrates or they can be fabricated into tough polyurethane rubbers, epoxies or polyesters.

DETAILED DESCRIPTION

The novel polymers of this invention are perfluoroalkyl-alkylene substituted polymers or copolymers of 1,4-butadiene or isoprene with from 40 to 4000 connected carbon atoms in the chain, optionally terminated on one or both ends thereof with a condensation reactive group and containing at least one unit of one of the following structures for every 100 carbon atoms:

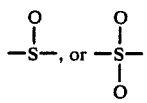
(A)

or

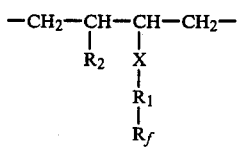

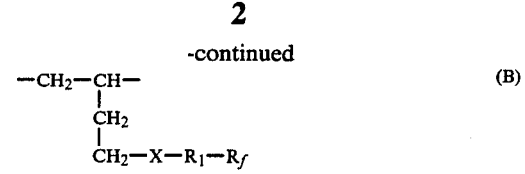
(B)

wherein: X is sulfur,

$R_1$ is either alkylene of from 1 to 16 carbon atoms or is of the structure $$-R_1'-Q-R_3-$$

wherein
$R_1'$ and $R_3$ are alkylene groups of 1–16 carbon atoms, with the sum of carbon atoms being no greater than 25;
$R_2$ is hydrogen or methyl;
Q is $-O-$, or $-NR_4-$, wherein
$R_4$ is hydrogen or alkyl or 1–4 carbon atoms; and
$R_f$ is a linear or branched perfluoroalkyl or perfluoroalkoxyperfluoroalkyl group with 4–20 carbon atoms, and preferably of structures $$CF_2-(CF_2)_n-,$$

where $n=3$ to 19, or $$(CF_3)-CFO(CF_2)_m-,$$

where $m=1$ to 10.

In a highly preferred embodiment, X is $-S-$; $R_1$ is alkylene of 2 to 6 carbon atoms; $R_2$ is hydrogen or methyl; $R_f$ is n-perfluoroalkyl of 4 to 18 carbon atoms; or mixtures thereof.

In addition to groups (A) and (B), the polymer may also contain up to 40 mole percent of other conventional copolymer groups (C), preferably

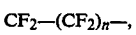

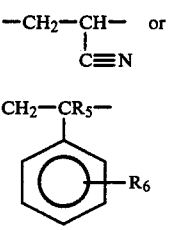

wherein $R_5$ is hydrogen or lower alkyl and $R_6$ is hydrogen or lower alkyl; incorporated into the original polydiene by copolymerization therewith.

Other conventional copolymer groups (C) include those copolymer units of conventional monomers, such as $C_1$–$C_2$ alkyl and $C_6$–$C_{12}$ aryl esters of acrylates, methacrylates, maleates, fumarates, and itaconates; vinyl esters having 1 to 18 carbon atoms in the ester group, such as vinyl acetate, butyrate, laurate, stearate and benzoate; vinyl chloroacetate and isopropenyl acetate; $C_1$–$C_{20}$ alkyl vinyl ethers, including methyl vinyl ether and n-octadecyl vinyl ether; vinyl halides, including vinyl chloride, vinylidine chloride, vinyl fluoride; methacrylonitrile; chloroprene; halogenated butadienes such as 2-fluoro-butadiene, tri- and pentafluorobutadiene; and halogenated styrenes, such as p-chlorostyrene.

Furthermore, the polymer may contain up to 20% mole of structural units (D):

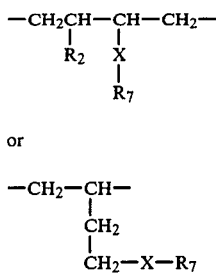

or

—CH$_2$—CH—
      |
     CH$_2$
      |
    CH$_2$—X—R$_7$ wherein R$_7$ is an aliphatic, aromatic or aryl-alkylene group of up to 30 carbon atoms which is unsubstituted or substituted with functional groups including hydroxyl, amino, mono- or di-(lower)alkylamino, carboxy, siloxane or halogen, and X and R$_2$ are as defined above.

When present, each of (C) and (D), respectively are present in an amount of at least about 0.01 mole percent.

Structures (A) are obtained by addition of perfluoroalkyl-alkylene thiols onto the internal double bonds of polydienes whose monomer units are connected in the 1,4-manner; structures (B) are derived by addition to the external double bonds of poly dienes whose monomer units are connected in the 1,2-manner. Polymers containing (A) where X=—S—, can be considered copolymers of perfluoroalkylalkylene-vinyl thioether, polymers with units (B) are copolymers of perfluoroalkyl alkylene-butene-1,2-thioether.

Preferably, the novel polymers consist of polymers or copolymers of butadiene and/or isoprene, connected in the 1,4- and/or 1,2 manner (head-tail and head-head) and which may contain units of acrylonitrile or styrene or alpha-methylstyrene or other copolymerizable monomers (C), and which as a molecular weight of 500–500,000, substituted by perfluoroalkyl alkylene group, as in (A) and (B), to such an extent that at least 1 perfluoroalkyl group is present for every 100 connected carbon backbone atoms. The polymer may further be substituted by linear or branched aliphatic, cycloaliphatic or aromatic hydrocarbon moieties with from 2 to 30 carbon atoms, which moieties may also contain hydroxy, amino, carboxy, or other functional groups, with up to about 20 of such non-fluorinated groups for every 100 connected backbone carbon atoms as in (D). All pendant substituent groups, fluorinated or non-fluorinated, are advantageously connected to the original poly-diene by either sulfur, sulfoxide or sulfone linkages.

The process for making the novel R$_f$-modified polymers consists of reacting a perfluoroalkyl-alkylene thiol with a polydiene or diene-copolymer in a suitable solvent or heat in the presence of a free-radical generating initiator. The corresponding sulfoxides and sulfones are advantageously derived from the thio-ether product by an oxidation step.

PERFLUOROALKYL ALKYLENE THIOLS

The perfluoroalkyl thiols employed in the preparation of the compounds of this invention are well known in the prior art. For example, thiols of the formula R$_f$—R$_1$—SH have been described in a number of U.S. patents including U.S. Pat. Nos. 2,894,991; 2,961,470; 2,965,677; 3,088,849; 3,172,190; 3,544,663 and 3,655,732.

Thus U.S. Pat. No. 3,655,732 discloses mercaptans of formula

R$_f$—R$_1$—SH where R$_1$ is alkylene of 1 to 16 carbon atoms and R$_f$ is perfluoroalkyl and teaches the halides of formula R$_f$—R$_1$—hal are well known; reaction of R$_f$I with ethylene under free-radical conditions gives R$_f$(CH$_2$CH$_2$)$_a$I while reaction of R$_f$CH$_2$I with ethylene gives R$_f$CH$_2$(CH$_2$CH$_2$)$_a$I as is further taught in U.S. Pat. Nos. 3,088,849; 3,145,222, 2,965,659 and 2,972,638.

U.S. Pat. No. 3,655,732 further discloses compounds of formula

R—R$_1$—X—R$_3$—SH where R$_1$ and R$_3$ are alkylene of 1 to 16 carbon atoms, with the sum of the carbon atoms of R$_1$ and R$_3$ being no greater than 25; R$_f$ is perfluoroalkyl of 4 through 14 carbon atoms and X is —S— or NR$_4$ is hydrogen or alkyl of 1 through 4 carbon atoms.

U.S. Pat. No. 3,544,663 teaches that the mercaptan

R$_f$CH$_2$CH$_2$SH where R$_f$ is perfluoroalkyl of 5 to 13 carbon atoms, can be prepared by reacting the perfluoroalkyl alkylene iodide with thiourea or by adding H$_2$S to a perfluoroalkyl substituted ethylene (R$_f$—CH=CH$_2$), which in turn can be prepared by dehydrohalogenation of the halide R$_f$—CH$_2$CH$_2$—hal.

The reaction of the iodide R$_f$—R$_1$—I with thiourea followed by hydrolysis to obtain the mercaptan R$_f$—R$_1$—SH is the preferred synthetic route. The reaction is applicable to both linear and branched chain iodides. Many useful perfluoroalkoxyalkyl iodides are described in Australian Application 36868 filed Apr. 24, 1968, of general formula (CF$_3$)$_2$CFOCF$_2$CF$_2$(CH$_2$CH$_2$)$_m$I where m is 1–3.

Particularly preferred herein are the thiols of formula

R$_f$CH$_2$CH$_2$SH where R$_f$ is perfluoroalkyl of 6 to 12 carbon atoms. These R$_f$-thiols can be prepared from R$_f$CH$_2$CH$_2$I and thiourea in very high yield.

Illustrative examples of preferred perfluoroalkylalkylenethiols are:

C$_4$F$_9$CH$_2$CH$_2$SH

C$_6$F$_{13}$CH$_2$CH$_2$SH

C$_8$F$_{17}$CH$_2$CH$_2$SH

C$_{10}$F$_{21}$CH$_2$CH$_2$SH

C$_{12}$F$_{25}$CH$_2$CH$_2$SH

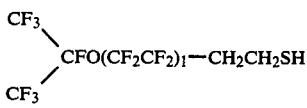

Especially preferred perfluoroalkylalkylenethiols are:

$C_6F_{13}CH_2CH_2SH$ $C_8F_{17}CH_2CH_2SH$ $C_{10}F_{21}CH_2CH_2SH$ and mixtures thereof.

POLYDIENES

The polydienes useful for preparing the novel polymers are homo- or copolymers of butadiene, such as polybutadienes with ratios of 1,4 to 1,2 connected units of 80/20 to 10/90; these are typical values of what is of what is commonly called 1,4-polybutadiene and 1,2-polybutadiene. Poly-(styrene-co-butadiene); poly(acrylonitrile-co-butadiene); poly-(-alpha-methyl styrene-co-butadiene) are especially preferred copolymers. The polymers can be terminated by functional groups on one or both ends, such as: carboxy-, hydroxy-, mercapto-, amino-, epoxy- and isocyanate groups; the polymers have typically a molecular weight of about 400–10,000, preferably of about 900–6,000. Polybutadienes with terminal condensation reactive groups are especially useful since they can be used in polycondensation reactions, for instance in polyurethane and epoxy formulations. Functional groups may also be attached to the backbone.

PROCESS

The reaction is carried out in an ampoule or a flask under nitrogen with good mixing. Initially the reaction mixture is often whitish at room temperature due to the insolubility of $R_fCH_2CH_2SH$ in the dienepolymer solution. After the reaction is completed (3 hours at 80° C. in the case of benzoyl peroxide as initiator) the cooled-down solution is clear, unless the fluorine content is so high that the product is insoluble.

Any solvent which will dissolve the polydiene at the reaction temperature can be used. Such solvents are aliphatic and aromatic hydrocarbons, chlorinated hydrocarbons, ketones, esters, ethers and alcohols; useful solvents include heptane, acetone, methyl-ethyl ketone, dimethylformamide, tetrahydrofuran, N-methylpyrrolidone, and butyl acetate. Alternately, the reaction can be carried out in bulk, if the viscosity of the polymer at reaction temperature is sufficiently low. The free radical generating initiators can be any of the commonly used peroxy compounds with a suitable half-life time at the reaction temperature, such as benzoyl, peroxide, lauroyl peroxide, or it can be of the azo-type, for instance, Azo-bis-isobutyronitrile. The initiators are used at concentrations of from 0.01% to 1%, based on weight of reaction. 50–70% of the double bonds in commercial 1,2-polybutadiene (90% 1.2) can be substituted with $R_fCH_2CH_2SH$, but only 10–20% of the double bonds in 1,4-polybutadiene (20% 1.2). Highly fluorinated products can be obtained as clear viscous resins either in solution or in bulk and which have little or no 1,2-double bonds left, according to IR analysis.

An $R_f$-thiol of a molecular weight of ~500 and the polydiene can be reacted in weight ratios from 1:99 to 90:10 in the case of 1,2-polybutadiene, 1:99 to 60:40 in the case of 1,4-polybutadiene; in the case of diene copolymers the upper ratio is correspondingly lower because of a lower concentration of double bonds. Polymers containing up to 70% $R_fCH_2CH_2SH$ (45% F) are soluble in heptane, polymers with higher $R_f$ content need increasing amounts of FREON or hexafluoroxylene for dissolution.

Any unreacted $R_f$-thiol can be removed by stripping the product in vacuo at elevated temperature.

The $R_f$-substituted polydienes can be used as is, or they can be extended with other suitable polymers and applied to substrates to form coatings with low free surface energy, which are therefore highly oil- and water repellent. They can be cured by peroxides or metal salts and heat through the remaining double bonds; and they can be reacted with other double bond containing compounds, such as acrylates, methacrylates, styrenes, vinylesters, vinylethers, fumarates, maleates, etc.; if they contain terminal reactive groups, they can be used in polycondensation reactions to form, for instance, polyurethanes. It is also possible to carry out more reactions with the remaining double bonds, such as addition of thioglycolic or thiopropionic acids to make a water soluble resin, or of thiols in general (n-alkyl thiols). Other addition-reactions which can be carried out are addition of chlorine or bromine, of HCl, of vinyl compounds such as acrylate, fumarate, styrene, maleic anhydride.

In the following examples $R_fCH_2CH_2SH$ denotes a mixture of thiols with the following distribution of $R_f$ chain lengths:

$C_6F_{13}$—: 25%
$C_8F_{17}$—: 50%
$C_{10}F_{21}$—: 25%

1,4-polybutadiene used in the examples refers to a low molecular weight resin, containing 20% 1,4-cis, 60% to 1,4-trans and 20% 1,2-connected units; 1,2-polybutadiene[1] is a low molecular weight resin containing 10% 1,4-trans and 90% 1,2-units.

(1) 1,4-polybutadiene: poly-BD resin from Sinclair 1,2-polybutadiene: "HYSTL" resin from HYSTL Development Corp.

Oxidation of the $R_f$-thioether substituted polymers to the sulfoxides or sulfones is preferably carried out in solution using any of the conventional oxidizing agents, like organic peroxides such as peroxy acetic acid, $H_2O_2$, permanganate or chromate. Alternatively, the oxidation can be carried out in the solid dry state by surface oxidation of a coating, for instance with peroxide.

The following examples 1–15 describe the addition reaction of $R_f$-alkylene thiols to different poly-butadienes.

EXAMPLE 1

2 g $R_fCH_2CH_2SH$, 2 g 1,4-polybutadiene MW:1000, 0.1 g azo-bis-isobutyronitrile (AIBN) and 6.7 g heptane were sealed in an ampoule under nitrogen and shaken at 60° C. for 3½ hours. After cooling, the reaction product was obtained as a clear solution in 99% yield as determined by stripping of volatiles in vacuo at 100° C.

EXAMPLE 2

Example 1 was repeated, but with 1,2-polybutadiene (MW:1000). The product was again obtained as a clear solution in 99% yield.

EXAMPLES 3-5

Using the same procedure as in Example 1, $R_fCH_2CH_2SH$ and 1,4-polybutadiene (MW:1000) were reacted in different ratios with the following results:

| Example No. | $R_fCH_2CH_2SH$ (g) | 1,4-P-bu (g) | AIBN (g) | Heptane (g) | $R_fCH_2CH_2SH$ Conversion (%) |
|---|---|---|---|---|---|
| 3 | 4 | 2 | 0.1 | 9 | 79 |
| 4 | 6 | 2 | 0.1 | 10 | 63 |
| 5 | 10 | 2 | 0.1 | 14 | 55 |

EXAMPLES 6-10

$R_fCH_2CH_2SH$ was reacted as in Example 1 with different amounts of 1,2-polybutadiene with the following results:

| Example No. | $R_fCH_2CH_2SH$ (g) | 1,2-P-bu MW: 1000 (g) | AIBN (g) | Heptane (g) | Conversion of $R_fESH$ (%) |
|---|---|---|---|---|---|
| 6 | 4 | 2 | 0.1 | 9 | 99 |
| 7 | 6 | 2 | 0.1 | 10 | 96 |
| 8 | 10 | 2 | 0.1 | 14 | 94 |
| 9 | 10 | 2 | 0.1 | 14 | 84 |
| 10 | 15 | 2 | 0.2 | 17 | 75 |

EXAMPLES 11 AND 12

A butadiene-styrene copolymer (OH-terminated; MW:4000, 25% styrene was reacted as in Example 1 with different amounts of $R_fCH_2CH_2SH$, with the following results:

| Example No. | $R_fCH_2CH_2SH$ (g) | Polybu-Co-styrene (g) | AIBN (g) | Heptane (g) | Conversion % |
|---|---|---|---|---|---|
| 11 | 2 | 2 | 0.1 | 6 | 75 |
| 12 | 4 | 2 | 0.1 | 8 | 72 |

EXAMPLES 13 AND 14

The above experiments were repeated, but with a butadiene-acrylonitrile copolymer OH-terminated; (15% acrylonitrile; MW:~3800) instead of the styrene copolymer and MEK instead of heptane. The results were as follows:

| Example No. | $R_fCH_2CH_2SH$ (g) | Polybu-Co-acrylonitrile (g) | AIBN (g) | MEK (g) | Conversion % |
|---|---|---|---|---|---|
| 13 | 2 | 2 | 0.1 | 6 | 80 |
| 14 | 4 | 2 | 0.1 | 8 | 63 |

EXAMPLE 15

50 g 1,2-polybutadiene (MW:1000; OH-terminated) and 70 g $R_fCH_2CH_2SH$ were heated in a 3-neck flask equipped with stirrer, thermometer, condenser and nitrogen inlet tube; at 90° C. the white, creamy mixture developed a slow exotherm reaction, during which the mixture became clear. After 2 hours reaction time 0.2 g AIBN were added and the reaction continued at 80° C. for 4 more hours. Unreacted thiol was stripped off in vacuo at 90° C. using a nitrogen purge for ½ hour. The product was a clear, colorless and almost odorless resin of very high viscosity.

Yield: 116 g; (94%).

The following examples describe the synthesis of anionic and cationic water dispensible $R_f$-alkylene thiol substituted polybutadiene.

EXAMPLE 16

50 g 1,2-polybutadiene (MW:1000; OH-terminated) and 50 g $R_fCH_2CH_2SH$ were reacted in 30 MEK with 0.25 g AIBN to form the adduct at 75° C. in 4 hours in 98% yield. To the clear solution 42.6 g thiopropionic acid —HS—CH$_2$CH$_2$SOOH— were added together with 30 g MEK and 0.2 g AIBN and the reaction continued for 3 hours. The reaction product was obtained in 96% yield as a viscous 68% solution in MEK; most of the double bonds had been consumed as shown by IR. This resin, after neutralization with triethylamine, formed a clear solution in water.

EXAMPLE 17

Preparation of Polyurethane Coatings 50 g (0.05 mol) 1,2-polybutadiene (MW:1000; OH-terminated) and 50 g (~0.1 mol) $R_fCH_2CH_2SH$ were reacted in 30 g dry MEK using 0.25 g AIBN at 75° C. for 4 hours. Then 22.2 g (0.1 mol) of isophorone diisocyanate were added together with 0.05 g triethylamine and the mixture was stirred for 2 hours at 50° C., after which time the % NCO has fallen to 6.1%, indicating formation of an isocyanate terminated prepolymer.

A film cast from this prepolymer solution was left to cure on the air and formed a hard, glossy film, having a free surface energy of 13 [dynes/cm]. To another sample of the prepolymer solution were added a molar excess of N,N-dimethyl-propane-1,3-diamine; after all -NCO groups had reacted, acetic acid was added, followed by water; a viscous, white-bluish emulsion was formed.

A film cast from this emulsion had an oil- but not water-repellent surface and a free surface energy of 12 [dynes/cm].

The following examples describe the synthesis of $R_f$-substituted polyurethanes and epoxies from $R_f$-alkylene thiol substituted, functionalized polybutadienes.

EXAMPLE 18

12.5 g 1,2-polybutadiene of MW 1430, OH-terminated, was reacted in bulk with 70 g $R_fCH_2CH_2SH$ using 0.25 g AIBN as initiator and letting the exotherm rise to 100° C. A solids determination indicated after 4 additional hours at 70° C. nearly complete conversion. 3.25 g isophorone diisocyanate were added dissolved in 50 g dry MEK together with 3 drops triethylamine and the mixture was stirred at 60° C. for six hours. Another 50 g dry MEK were added and the solution cooled to room temperature.

By evapoarating the solvent a straw colored rubber could be isolated from this solution, which was extremely tough, although not crosslinked. It contained, as determined by elemental analysis, 44% fluorine.

EXAMPLE 19

In a similar manner a tough and flexible perfluoroalkyl substituted polybutadiene-polyurethane rubber was prepared from 25 g OH-terminated 1,2-polybutadiene (MW:1430), 70 g $R_fCH_2CH_2SH$ and 7.5 g isophorone diisocyanate.

EXAMPLE 20

51 g of an epoxy group containing polybutadiene (MW:800; oxirane content 6.9%) were reacted at 50° C. in bulk with 55 g $R_fCH_2CH_2SH$, using three times 0.1 g VAZO-52 (azoinitiator from Du Pont) over five hours. Unconverted $R_fCH_2CH_2SH$ was stripped off in vacuo at 90° C. Conversion was 88% and the oxirane content of the product 3.22% (by titration). 5 g of this product were mixed with an equimolar amount of perfluoroalkyl alkylene thio substituted methendic anhydride[(1)] and 0.05 g dimethyl-benzylamine as accelerator and heated to 100° C. for eight hours. A brown, clear, tough disc of an epoxy-polymer was obtained which was not wetted by heptane and had a water pick-up in 30 days of 0.55%.

(1)

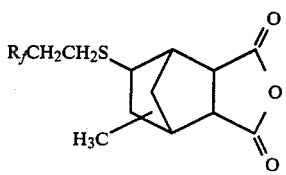

The following examples show the use of $R_f$-modified polybutadiene-diols in preparation of poly-urethane finishes.

EXAMPLE 21

To a 500 ml three neck flask, equipped with stirrer, thermometer, reflux-condenser, N-inlet tube and heating mantle were added 92.25 g of OH-terminated 1,2-polybutadiene (MW:1000) modified with $R_fCH_2CH_2SH$ in a ratio of one residual double bond per $R_f$-chain, 1.27 g trimethylhexamethylenediisocyanate, 92.94 g butylacetate, 0.46 g dibutyltridilaurate 10% in butylaacetate and 0.12 g triethyl onium 10% in butyldichloride solution charged and under stirring heated to 80° C. After 9 hours most of the diisocyanate was consumed and 3.65 g dimerdiisocyanate, 1.073 g N-methyldiethanolamine and 4.72 g butylacetate were added. All isocyanate was reacted after 90 min. stirring at 80° C. A yellow paste with a solid content of 50% and a calculated fluorine content of 51.27 in solids was collected.

The solution was postemulsified in the following manner:

86 g deionized water, containing 0.5 g acetic acid 100% and 3.06 g of methylpolyoxyethylene (15)-coco ammonium chloride were heated in a 500 ml beaker to 80° C. 57 g of the $R_f$-modified PU-solution described above were heated to 80° C. and poured into the water-/emulsifier solution under stirring with a high speed mixer.

This pre-emulsion was homogenized with a high pressure homogenizer for 10 min. and 300 bar pressure. After transforming the emulsion to a 500 ml flask, butylacetate was distilled under vacuum.

An off white emulsion was collected with a solid content of 22.0% and a fluorine content of 10.7%.

A polyester/cotton fabric treated from treatment bath, combining 1.9% of the $R_f$-emulsion described above, 7% of a glycol-urea-resin and 1% of a $ZnNO_3$-solution (50%) at a 50% add-on level, dried and cured for 5 min. at 150° C. showed an oil repellency rating of 6, (according to the AATCC-test method 118-1972) a spray rating of 100 (AATCC test 22-1978).

The following example shows the oxidation of the thio-ethers to the corresponding sulfone and their performance as oil- and water repellent textile treatments.

EXAMPLE 22

100 g of a 65% butylacetate solution of $C_8F_{17}CH_2CH_2SH$-adduct to 1,2-polybutadiene (1000 MW) having a ratio of 1 $R_f$-mercaptan to 3 unsaturated groups on the polymer backbone, was poured into a solution of 7.15 g polyoxyethylene (10)-hexadecyl ammonium-acetate and 60 g $H_2O_2$-(30%) in 153.6 g deionized water using a high speed mixer. This pre-emulsion was homogenized for 10 min. on the high-pressure homogenizer (Type "Gaulin") at 300 bar pressure and 60° C. The obtained emulsion had a solid content of 19.76% and a calculated fluorine content of 8.3%.

The emulsion was applied onto a polyester/cotton poplin at a 50% solid add-on level with a treatment bath of the following composition:

0.2% acetic acid, 7% of a 53% solution of glyoxal urea resin, 1% of a 50% $Zn(NO_3)_2$ solution and 3.6% of the emulsion maintained above. The fabric was dried and cured for 5 min. at 150° C.

It had an oil repellency of 5 according to the AATCC-test 118-1972 and a spray rating of 100 (AATCC-test 22-1974), whereas the same emulsion, not treated with $H_2O_2$ during the emulsification had an oil repellency of 1 and a spray rating of 70.

What is claimed is:

1. A perfluoroalkyl-alkylene substituted polymer of 1,4-butadiene or isoprene comprising 40–400 connected monomer carbon atoms in the chain, said chain containing, for every 100 carbon atoms, at least one structural unit selected from A and B

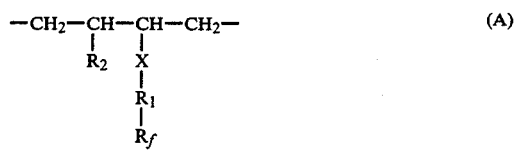

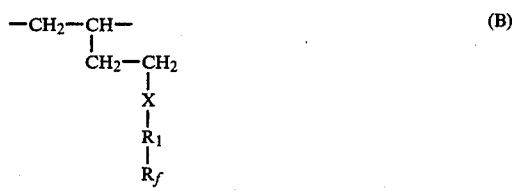

wherein X is —S—, SO—, or —$SO_2$—, said polymer further comprising 0 to 40 mole% of a conventional copolymerizable group (C), and 0 to 20% of at least one structural unit (D) selected from

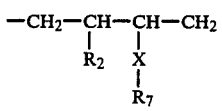

and

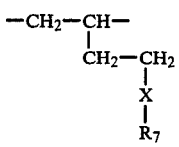

wherein
X is as defined above,
R₁ is either alkylene of from 1 to 16 carbon atoms or is of the structure

—R₁′—Q—R₃— wherein
R₁′ and R₃ are alkylene groups of 1-16 carbon atoms, with the sum of carbon atoms being no greater than 25;
R₂ is hydrogen or methyl;
Q is —O—, or —NR₄—, wherein
R₄ is hydrogen or alkyl of 1-4 carbon atoms; and
R$_f$ is a linear or branched perfluoroalkyl or perfluoroalkoxyperfluoroalkyl group with 4-20 carbon atoms,
R₇ is an aliphatic, aromatic or aryl-alkylene group of up to 30 carbon atoms which is unsubstituted or substituted by hydroxyl, amino, mono- or di-(lower)alkylamino, carboxy, siloxane or halogen.

2. A perfluoroalkylene-alkylene substituted polymer according to claim 1, wherein X is —S—; R₁ is alkylene of 2 to 6 carbon atoms; R₂ is hydrogen or methyl; and R$_f$ is n-perfluoroalkyl of 4 to 18 carbon atoms, or mixtures thereof.

3. A perfluoroalkylene-alkylene substituted polymer according to claim 1, containing about 0.01 to 40 mole percent of said copolymer groups (C) consisting essentially of

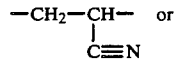

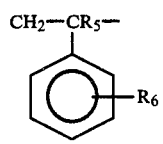

wherein R₅ is hydrogen or lower alkyl and R₆ is hydrogen or lower alkyl; incorporated into the original polydiene by copolymerization therewith.

4. The polymer of claim 1 wherein said chain is terminated on at least one end thereof with a hydroxy group.

5. A perfluoroalkylene-alkylene substituted polymer according to claim 1, wherein (D) is present in an amount of between about 0.01 to 20 mole percent.

6. A perfluoroalkylene-alkylene substituted polymer according to claim 4, which is terminated at both ends thereof.

* * * * *